Oct. 19, 1926.

J. H. C. MURDOCH 1,603,632

AUTOMOBILE HEADLIGHT CONTROL

Filed March 16, 1926    2 Sheets-Sheet 1

INVENTOR.
JAMES.H.C.MURDOCH,
ATTYS.

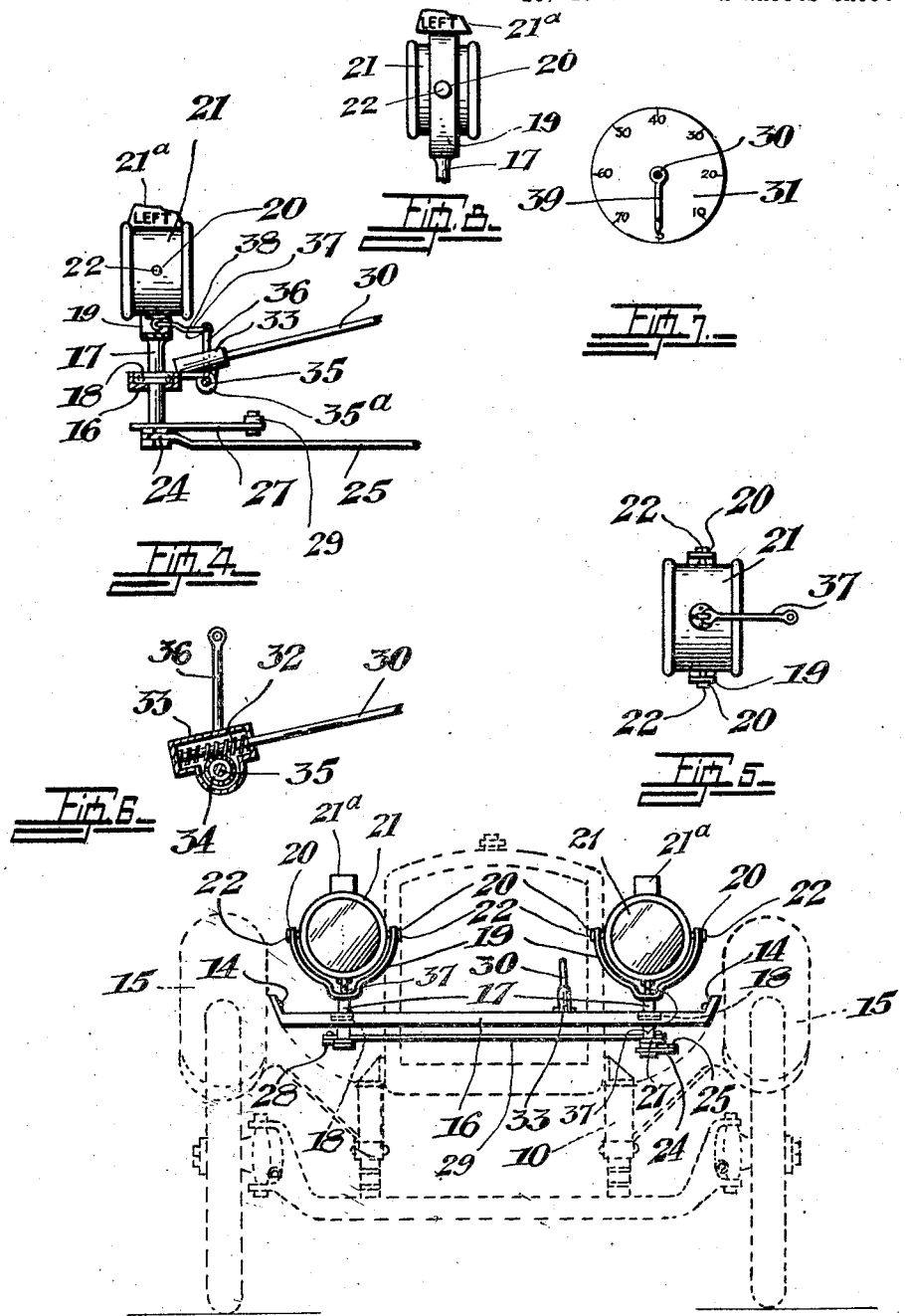

Patented Oct. 19, 1926.

1,603,632

UNITED STATES PATENT OFFICE.

JAMES HAROLD CURRIE MURDOCH, OF HALIFAX, NOVA SCOTIA, CANADA.

AUTOMOBILE HEADLIGHT CONTROL.

Application filed March 16, 1926. Serial No. 95,074.

This invention relates to improvements in automobile headlights and the objects of the invention are to provide a headlight for motor vehicles generally, operable simultaneously with the turning of the steering wheel and separately tiltable from the instrument board to any required angle.

Further objects are to provide a turnable and tiltable headlight for automobiles and the like of this description, the mechanism for operating which is a simple, durable and economical construction and which can be readily fitted to all existing makes of cars without interfering in any way with the existing construction.

A further object is to provide a mechanism for automobile headlights for simultaneously turning the headlights in the direction in which the vehicle is travelling and means operable from the instrument board for setting the headlights at any required angle while being turned.

A still further object is to provide dirigible and tiltable headlights adapted to be turned to correspond to the movement of the front wheels of the vehicle so that the rays from the headlight are properly positioned with relation to the movement of the vehicle and also to provide means for tilting.

Another object is to provide a dirigible headlight having simple means operable from the driver's seat whereby the same may be tilted on being moved about a horizontal axis so that the light rays may be directed at any suitable angle to illuminate each side of the road and whereby the glare is removed without dimming the headlights.

Still another object is to provide a headlight of highly simplified construction reliable in use and economical to manufacture.

Other advantages of the invention will be apparent during the course of the following description.

The invention consists essentially in the combination with tiltably mounted headlights provided with rotatably mounted supports, of means connecting the supports with the steering mechanism and means operable from the instrument board for tilting the headlights and setting them, when tilted, to any required angle.

Figure 1:
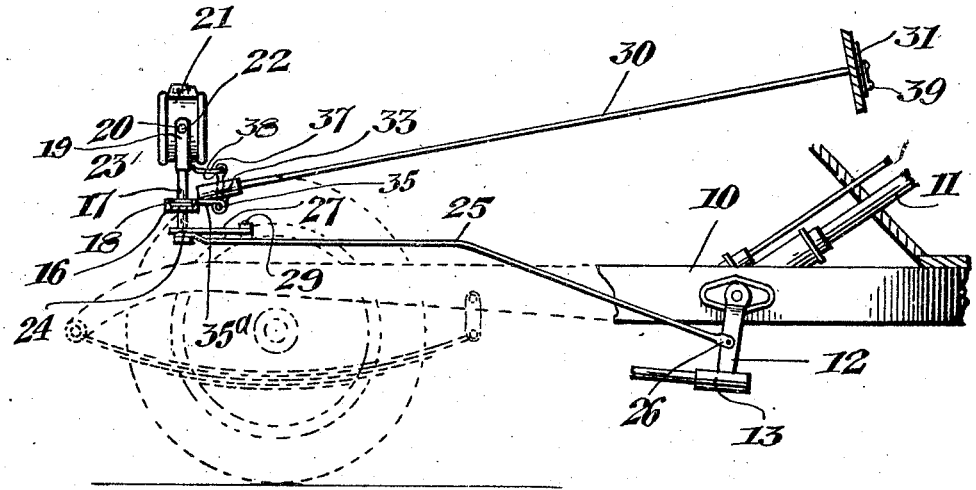
Figure 2:
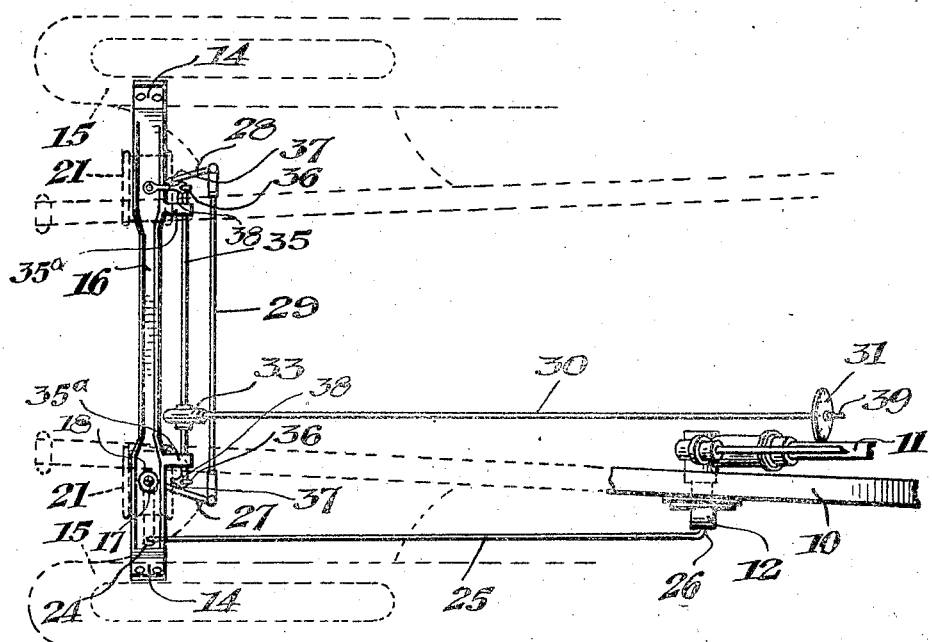

Referring now to the drawings in which like characters of reference indicate corresponding parts, Figure 1 is a side elevation of the forward portion of an automobile frame fitted with my improved headlights, Figure 2 is a top plan view, Figure 3 is a front elevation, the body and front wheels of the automobile being shown in dotted lines, Figure 4 is an enlarged side view of a tiltably and rotatably mounted headlight with the mechanism for operating the same, Figure 5 is a view of the underside of the tiltable headlight with operating rod for moving it in a tilted position, Figure 6 is a sectional detail of the mechanism for tilting the headlight from the driver's seat, Figure 7 is a plan view of the angle indicating disc for setting the headlight when operated.

Figure 8 is a detail view of a modified form of headlight carrier with direction indicator rigidly mounted thereon.

Referring now more particularly to the drawing in which a preferred example of my invention is shown, the numeral 10 designates the frame of an automobile, 11 the steering column and 12 the steering gear arm of well known construction to which is connected the steering mechanism by a drag link 13. Secured at each end, as at 14, and to the fender 15 is a channel bar 16 in which are mounted the headlight carrying-stems 17 rotatable therein by means of suitable disc bearings 18 carried by the channel bar. The upper ends of the stems 17 are formed with a semi-circular or cup-shaped support, carrying member 19 or they may be continued to form a complete circle as illustrated in the modified form in Figure 8 and in which are pivotally mounted as at 20 the headlights 21 by means of pins 22 adapted to engage with the orifices 23 in the carrier 19. The lower end of one of the supporting stems 17 has rigidly secured thereto, as at 24, the end of a rod 25 the other end of which is fixedly secured in any suitable manner to the steering arm 12 as at 26. This rod is suitably bent to give a more satisfactory result in operation.

21$^a$ is a signal or direction indicator formed integral with the headlight casing or on the carrier therefor, 19, and is arranged with the front thrown back at top so that when the light is tipped to remove glare the front of signal is brought parallel with light support.

In Figure 8 the headlight support is formed completely around and the signal is rigidly attached thereto.

From the foregoing it will be seen that on the movement of the steering column 11 to direct the front wheels in the required direction the rod 25, connected to the steering arm 12 and to the lamp stems, will be operated to move said stems in the bearings 18 and with them the headlights in the same direction as that in which the front wheels are directed, and as the headlights are connected to one another by arms 27 and 28, secured to the stems 17 and connected to one another by a cross rod 29, the turning movement through the rod 25 is automatically operated to both lights simultaneously to swing them to right or left. It will thus be seen that the lights are movable and adjustable to any angle, right or left, and upwardly and downwardly, by the means hereinafter to be described.

The action of tipping the lights up and down is separate and may be controlled electrically or mechanically from the instrument board or in any other suitable place by the driver. In the example of my invention here shown the mechanism for this purpose comprises an operating rod 30 extending through the instrument board and provided with, as at 31, an indicator plate having the degrees of angles marked around the periphery thereof. The other end of this rod 30 is formed with a worm gear 32 as illustrated in Figure 6 and is provided with a suitable casing 33 in which is also mounted a gear wheel 34 mounted on a rod 35 and adapted to mesh with the worm 32. This rod is suitably held in brackets 35ª on the channel bar 16. At each end of this rod 35 and integral therewith are vertical arms 36 loosely connected to a link 37 in turn loosely connected to an eye member on the underside of the headlights and to allow of universal joint action in permitting the lights to be readily tilted up or down. The outer end of the link 37 is formed with an eye 38 to loosely engage with arms 36 at each end of the rod 35 and at right angles thereto. On the end of the rod 30 extending through the instrument board is an indicator arm 39 at right angles thereto for operating the rod which, on being turned, causes, through the rod 30, the arms 36 to tip backwards and forwards and the headlights connected to these arms follow the same direction so that when the arms tip backwards the bottom of the light will tip backwardly, the light being swingingly mounted in the centre must tip ahead at the top and the light rays will be directed downwardly to the ground, then, by turning the arm 39 on the indicator plate in the opposite direction the lights will be re-adjusted to their former upright position. The signal 21ª consists essentially of a casing of any suitable construction, the sides of which are of transparent material and designed to have printed thereon direction indicating details the casing being illuminated in any well known manner.

The value of this signal, when the glare is automatically removed by the tilting of the headlights, will be apparent.

From practical experience it is found that while the tipping action may be controlled by a switch, the action of the worm gear is much more simple and the range greater.

The provision of the indicator plate in the dash board with the degrees marked thereon considerably helps in indicating the angle of light.

Another feature of my invention is that every part of the equipment as above described is placed above the springs and fastened to the mud guard so that there will be no extra road-jar carried to the lights enabling them to ride as steadily as in their ordinary rigid position.

As many changes could be made in the above construction and many apparently widely different embodiments of my invention, within the scope of the claim, constructed without departing from the spirit or scope thereof, it is intended that all matter contained in the present specification and accompanying drawings shall be interpreted in an illustrative and not in a limiting sense.

What I claim as my invention is:

In a device of the character described a channel bar, a pair of lamp supporting stems rotatably mounted in said bar, a pair of headlights tiltably mounted on said stems, arm and rod connections for the stems and a rod connecting one of the stems with the steering mechanism whereby on the latter being operated the headlights are simultaneously turned to correspond to the movement of the front wheels and means comprising arms secured to the headlights, a cross rod connecting the arms and provided with a gear, a rod with a worm thereon adapted to mesh with said gear, operable from the driver's seat for tilting the headlights.

In witness whereof I have hereunto set my hand.

JAMES HAROLD CURRIE MURDOCH.